US009635283B2

(12) United States Patent
Heinke (10) Patent No.: US 9,635,283 B2
(45) Date of Patent: *Apr. 25, 2017

(54) THERMAL IMAGER WITH LARGE DYNAMIC RANGE AND IMPROVED SIGNAL-TO-NOISE RATIO

(71) Applicant: Fluke Corporation, Everett, WA (US)

(72) Inventor: Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,041

(22) Filed: Oct. 26, 2015

(65) Prior Publication Data

US 2016/0044254 A1 Feb. 11, 2016

Related U.S. Application Data

(63) Continuation of application No. 14/046,705, filed on Oct. 4, 2013, now Pat. No. 9,196,026.

(51) Int. Cl.
*G06K 9/36* (2006.01)
*H04N 5/33* (2006.01)
*G06T 5/50* (2006.01)
*H04N 5/232* (2006.01)

(52) U.S. Cl.
CPC ............... *H04N 5/33* (2013.01); *G06T 5/50* (2013.01); *H04N 5/23216* (2013.01); *H04N 5/23232* (2013.01); *H04N 5/23293* (2013.01); *G06T 2207/10048* (2013.01); *G06T 2207/20208* (2013.01)

(58) Field of Classification Search
CPC .. H04N 5/33; H04N 5/23293; H04N 5/23216; H04N 5/23232; H04N 13/02; H04N 13/0239; H04N 1/3876; H04N 5/23238; G06T 5/50; G06T 2207/10048; G06T 2207/20208; H05B 37/0209; H05B 37/02; G01V 8/10; G01N 21/17

See application file for complete search history.

(56) References Cited

U.S. PATENT DOCUMENTS

| | | | | |
|---|---|---|---|---|
| 5,136,421 | A * | 8/1992 | Sagan | G02B 5/04 250/332 |
| 7,336,823 | B2 * | 2/2008 | Guldevall | H04N 5/33 348/E5.081 |
| 7,965,314 | B1 * | 6/2011 | Miller | G08B 13/19643 250/330 |
| 9,196,026 | B2 * | 11/2015 | Heinke | H04N 5/23216 |
| 2013/0235163 | A1 * | 9/2013 | Joo | H04N 13/007 348/47 |

(Continued)

*Primary Examiner* — Amir Alavi
(74) *Attorney, Agent, or Firm* — Fredrikson & Byron, P.A.

(57) ABSTRACT

A system for producing thermal images acquires at least first and second thermal images comprising a plurality of pixels and a first and second dynamic range, respectively. The second dynamic range is such that its upper limit is higher than that of the first, and at least partially overlaps the first. A final thermal image is created comprising pixels from the first thermal image that are not saturated or nearly saturated with respect to the first dynamic range, and pixels from the second thermal image that are saturated or nearly saturated with respect to the first dynamic range. The resulting final image generally comprises both a large dynamic range and high signal-to-noise ratio.

20 Claims, 8 Drawing Sheets

(56) References Cited

U.S. PATENT DOCUMENTS

2014/0112537 A1* 4/2014 Frank ................. H04N 5/33
 382/103
2016/0044254 A1* 2/2016 Heinke ............ H04N 5/23216
 348/164

* cited by examiner

| | | | | |
|---|---|---|---|---|
| 24 | 19 | 14 | 9 | 4 |
| 23 | 18 | 13 | 8 | 3 |
| 22 | 17 | 12 | 7 | 2 |
| 21 | 16 | 11 | 6 | 1 |
| 20 | 15 | 10 | 5 | 0 |

FIG. 4b

| | | | | |
|---|---|---|---|---|
| (4,4) | (4,3) | (4,2) | (4,1) | (4,0) |
| (3,4) | (3,3) | (3,2) | (3,1) | (3,0) |
| (2,4) | (2,3) | (2,2) | (2,1) | (2,0) |
| (1,4) | (1,3) | (1,2) | (1,1) | (1,0) |
| (0,4) | (0,3) | (0,2) | (0,1) | (0,0) |

THERMAL IMAGER WITH LARGE DYNAMIC RANGE AND IMPROVED SIGNAL-TO-NOISE RATIO

RELATED APPLICATIONS

This application is a continuation application of U.S. patent application Ser. No. 14/046,705, filed Oct. 4, 2013, now U.S. Pat. No. 9,196,026 the entire contents of which are incorporated herein by reference.

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

The dynamic range of a thermal image or a thermal imaging camera refers to the range of temperatures of a target scene that can be imaged by the camera at any one time. A large dynamic range corresponds to a large range of temperatures visible in a thermal image. In contrast, a small dynamic range implies that there is a relatively smaller range of temperatures observable within the scene.

Large and small dynamic ranges may be properties of thermal imaging cameras, or may be byproducts of parameters of the cameras. For example, a camera with an adjustable gain setting has a similarly adjustable dynamic range. As the gain of the camera is increased, the dynamic range generally decreases; similarly to the way in which zooming in on an image decreases the observable spatial range on a fixed display. The dynamic range in an image corresponds also to the amount of relative noise in an image. A larger dynamic range in an image will result in a lower signal-to-noise ratio as compared to an image of the same scene but a smaller dynamic range. On the other hand, a smaller dynamic range can result in saturation in an image if components of the thermal scene are present whose temperatures lie outside of the dynamic range.

Thus, a balance point is desired, wherein the dynamic range of thermal image is large enough so that the image does not saturate, but is kept small enough so as to minimize the amount of noise present in the image. This becomes more difficult as larger thermal ranges are demanded. Thermal scenes with a wide range of temperatures require a large dynamic range to be able to observe each temperature. However, the increase in noise can make it difficult to resolve portions of the image.

Previous systems have attempted to address this tradeoff by providing multiple thermal images, each image comprising neighboring or partly overlapping dynamic ranges. The system then scans the entirety of each image and selects portions from each image within its prescribed dynamic range to implement into a final image with an effective dynamic range spanning that of the set of images.

SUMMARY

Embodiments of the present invention can comprise a system for producing thermal images having a large dynamic range and a high signal-to-noise ratio. The system can comprise a thermal imaging camera for capturing thermal images, each of the images made up of a plurality of pixels and having a dynamic range. The system can comprise a processor for processing thermal images captured by the camera, configured to analyze a first thermal image having a first dynamic range. The first thermal image can be analyzed pixel-by-pixel, comparing each pixel to the first dynamic range. The processor can be configured to define a first set of pixels comprising pixels from the first thermal image that are not saturated or nearly saturated in the first dynamic range, and a second set of pixels comprising pixels that are not in the first set. The processor can create final thermal image comprising the first set of pixels from the first thermal image and the second set of pixels from a second thermal image, the second thermal image having a second dynamic range with an upper limit higher than that of, and at least partially overlapping, the first dynamic range. In some embodiments, the second thermal image is of substantially the same target scene as the first.

In such systems, the final image can effectively comprise the combined dynamic range of the both the first and second dynamic ranges without the high signal-to-noise ratio typically associated with thermal images with large dynamic ranges. The processor of the system is configured to analyze the first thermal image pixel-by-pixel and populate the final image with all appropriate pixels from the first thermal image. In some embodiments in which two images of a single target scene are utilized, only the first image needs to be analyzed, since all pixels in the final image not populated from the first thermal image can by automatically populated from the second thermal image without the need to analyze the second thermal image. Accordingly, inherent advantages of each image (large dynamic range, high signal-to-noise ratio, etc.) can be included in the final image without the need to spend time or processing power analyzing each pixel of each thermal image.

Embodiments of the invention can produce a final image from any number of thermal images with different dynamic ranges. In some embodiments, the dynamic ranges of the captured thermal images can be nested. That is, each dynamic range fully contains the each dynamic range smaller than it. Some systems comprise a user interface by which a user can select the number of images used to create the final image. Systems can also include a display on which to present the final images. Processes can be performed repeatedly to repeatedly update the display. In some systems, the display can be updated in real time.

In some embodiments, the first and second (any subsequent, non-final) thermal images can be analyzed in terms of digital counts detected by the thermal imaging camera. Accordingly, processing time and power is not used calculating temperature data for each pixel of each acquired image. In some cases, temperature data is calculated for the final image only.

Embodiments of the present invention further include computer readable media comprising instructions for causing a programmable processor to carry out methods such as that described above.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Shutters may be used for several applications within a thermal imaging camera. Such applications include but are not limited to blocking radiation from impinging on sensing elements, providing a uniform scene to the thermal imaging camera, or providing a scene of known temperature to a thermal imaging camera. Certain embodiments of the present invention comprise a shutter designed to better perform at least one such application than the present state of the art, and/or a thermal imaging camera comprising such a shutter.

Figure 1:
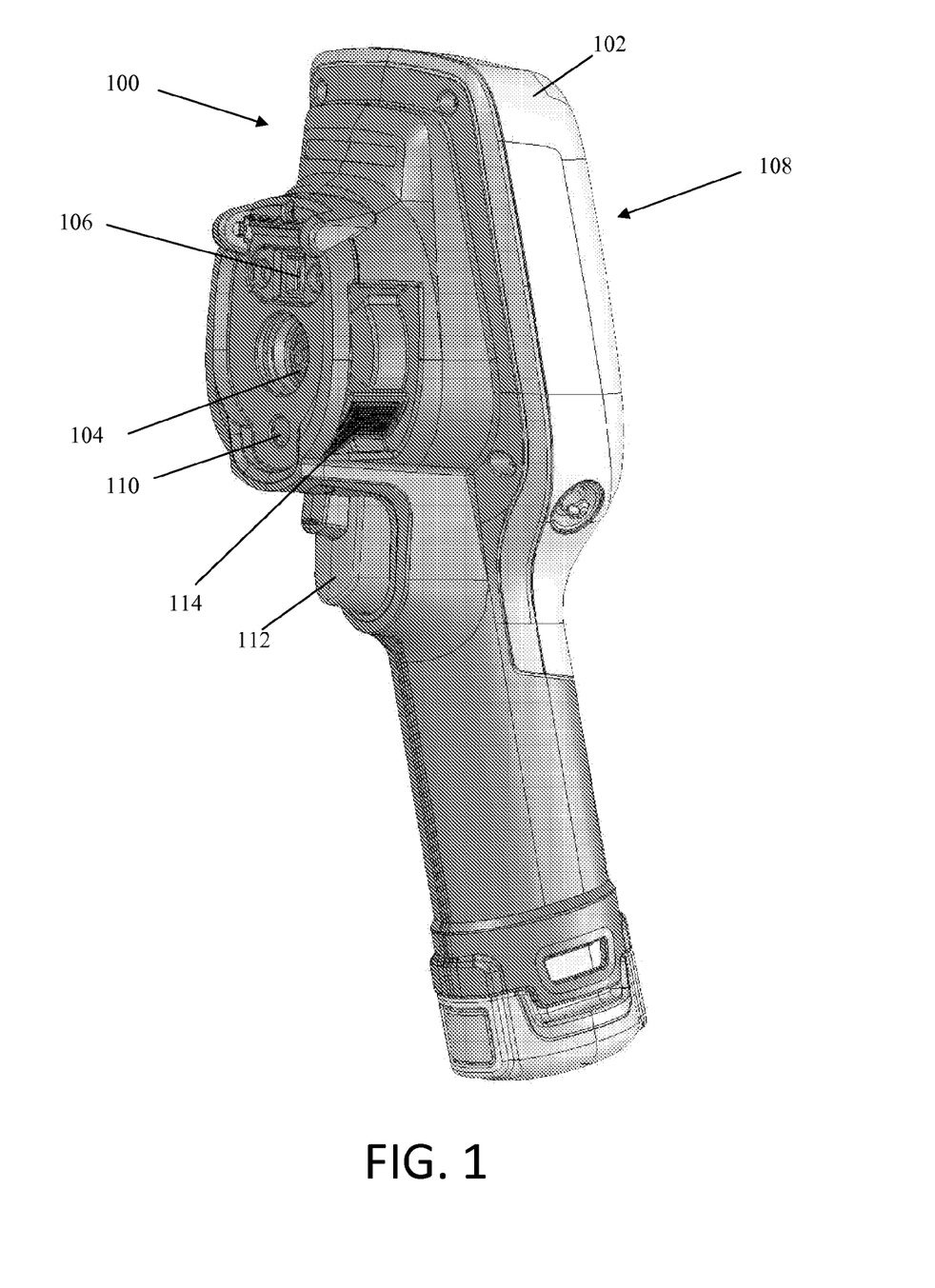
FIG. 1 is a perspective front view of an example thermal imaging camera.
Figure 2:
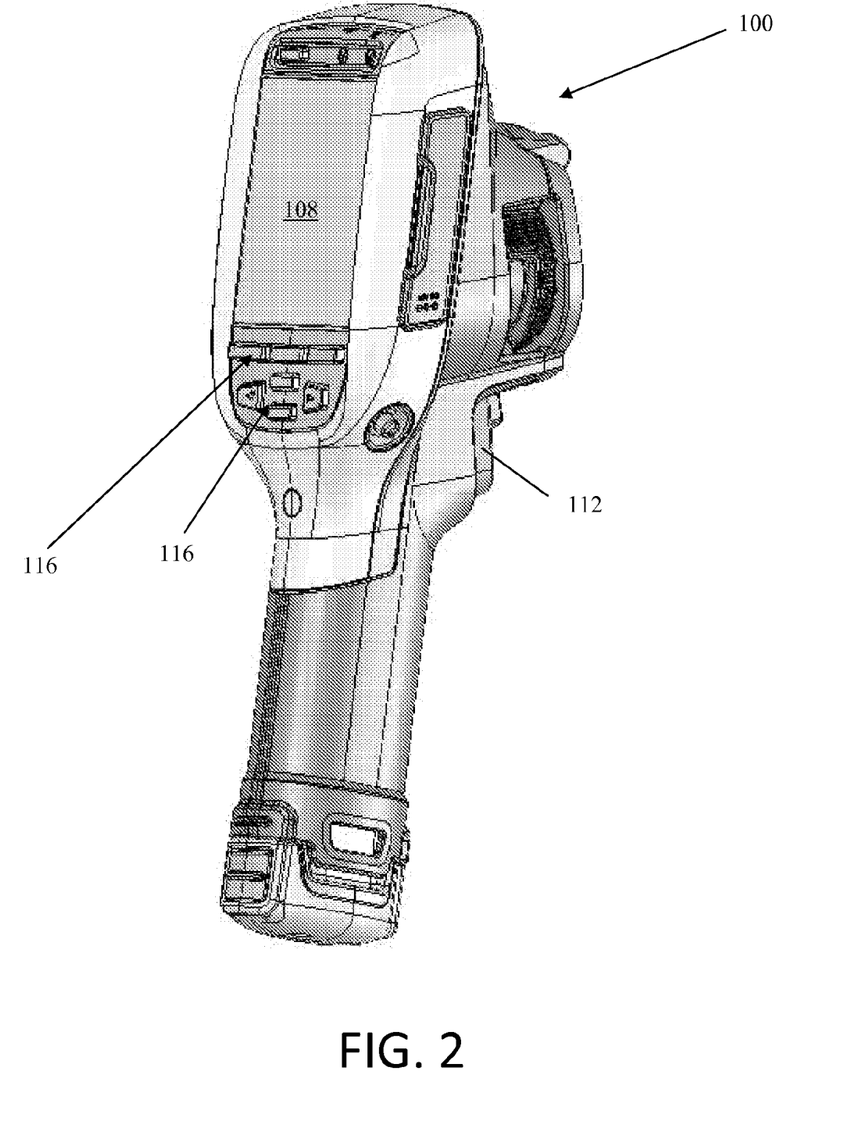
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a composite image that is a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
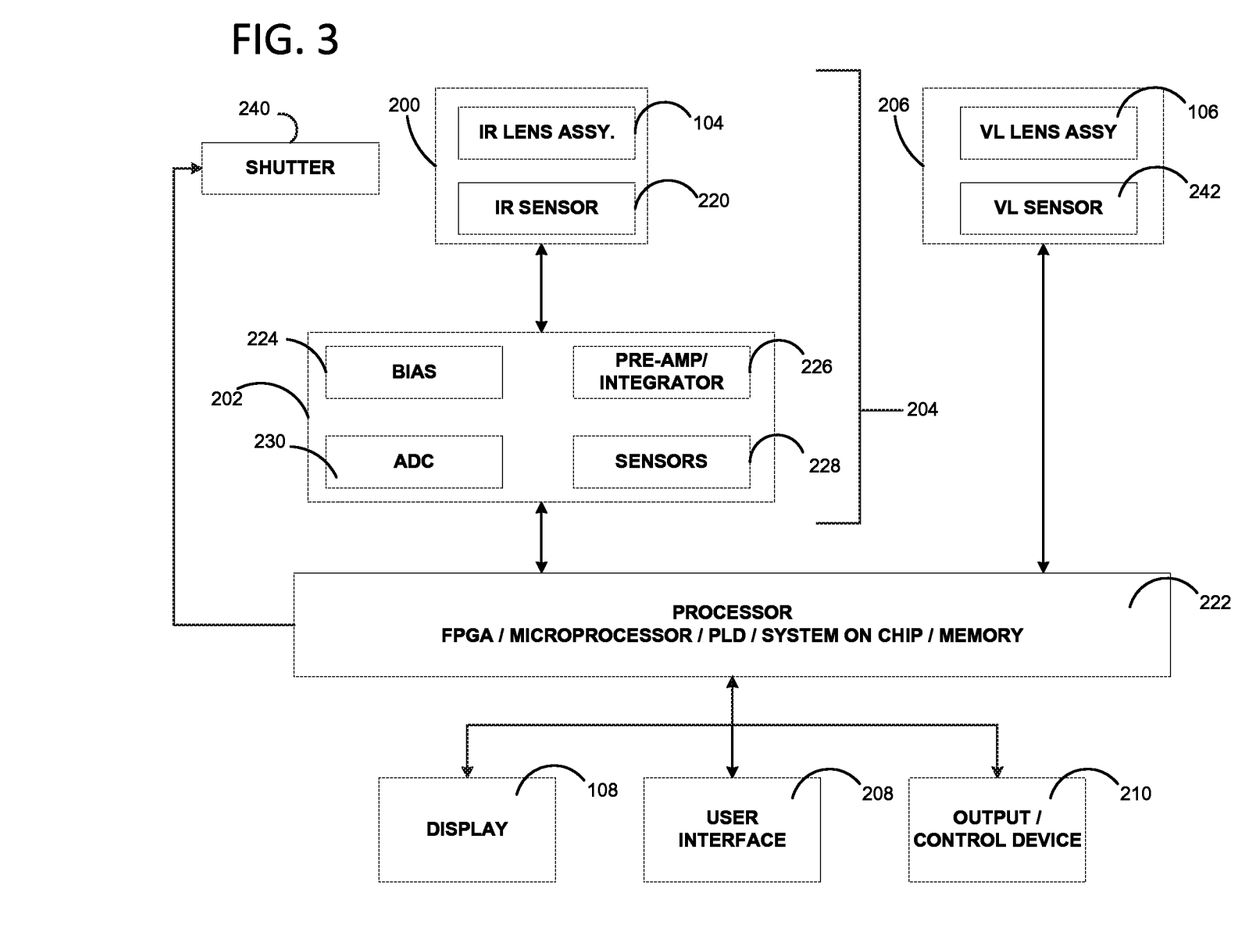
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 640×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the pixels.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226 for conditioning. Subsequently, the conditioned signals are sent downstream into the processor 222 of the thermal imaging camera 100.

In some embodiments, the front end circuitry 202 can include one or more additional elements for example, additional sensors 228 or an ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Certain embodiments of thermal imaging cameras comprise a shutter configured to block IR radiation from reaching the FPA. Additionally, some embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Processor 222 may also be implemented as a System on Chip that integrates all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data of a target scene at a given point in time.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Thermal imaging camera 100 includes visible light camera module 206. Visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242.

In these and other examples, processor 222 may control display 108 to concurrently display at least a portion of the visible light image captured by thermal imaging camera 100 and at least a portion of the infrared image captured by thermal imaging camera 100. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a composite image. In a composite image, the visible light image and the infrared image may be superimposed on top of one another. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque.

Additionally, in some embodiments, the processor 222 can interpret and execute commands from user interface 208, an output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

In many embodiments of thermal imaging cameras, shutters may serve several functions, including but not limited to blocking radiation from impinging on sensing elements, providing a uniform scene to the thermal imaging camera, or providing a scene of known temperature to a thermal imaging camera. It may be the case that a user does not wish for the sensing elements of a thermal imaging camera to be exposed to incident radiation at a certain time, and so might engage the shutter. Other processes such as radiometric calculations within a camera or biasing sensors to provide a more accurate representation of a thermal scene may require calibrations in which the shutter advantageously provides a uniform thermal scene and/or a scene of known temperature. Certain embodiments of the present invention comprise a shutter better suited than the current state of the art to perform tasks such as these.

Figure 4A:
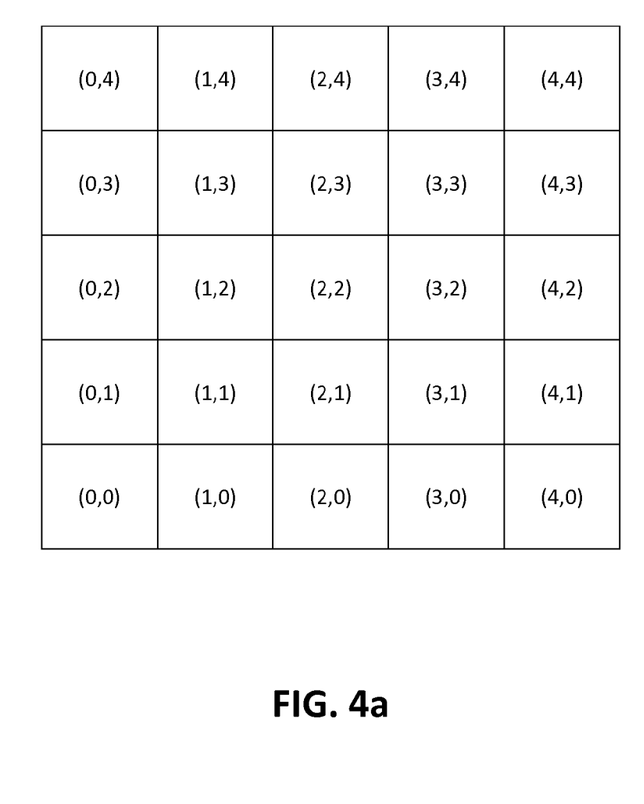
FIGS. 4a and 4b are examples of pixel coordinate systems defined in an image.
Figure 4B:
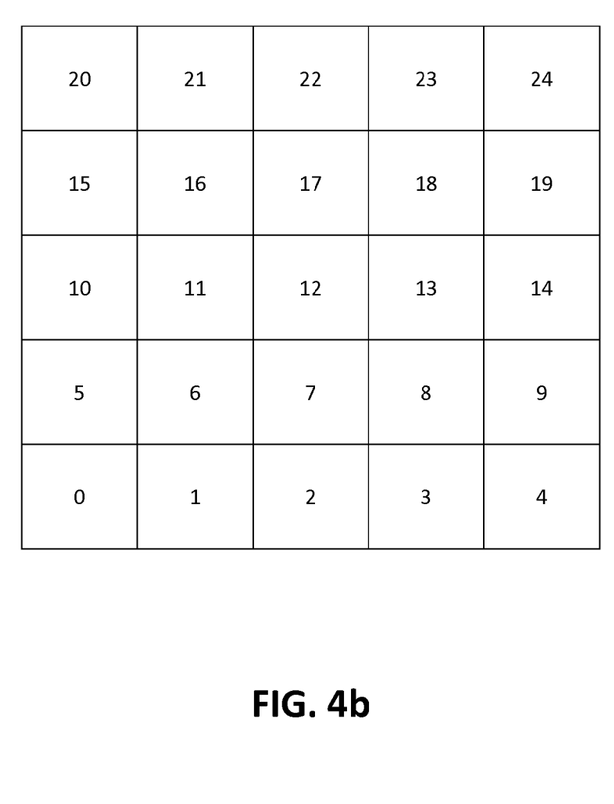

In analyzing thermal images taken from thermal imaging cameras as described above, it is often convenient to assign coordinates to each pixel within said images. This allows for localization of features contained within the image, and a consistent means by which to reference various features within an image to one another or a particular location such as a the center or an edge of a frame. Implementing a coordinate system into a set of pixels may be done in several ways. FIGS. 4a and 4b exemplify two such ways, but it should be appreciated that methods are not limited to those disclosed herein.

FIG. 4a illustrates a two-dimensional pixel coordinate system. In this case, there are two axes representing a two-dimensional image, with each pixel being associated with a pair of coordinates, for example (1,1). Shifting one pixel to the right increases the first coordinate by one, while shifting to the left decreases the first coordinate by one. Similarly, shifting one pixel up increases the second coordinate by one, and shifting one pixel down decreases the second coordinate by one. In this particular example, the pixel in the bottom-left corner of the image is associated with coordinates (0,0). Accordingly, the pixel with coordinates (1,1) is one pixel above and one pixel to the right of the bottom-left corner.

FIG. 4b illustrates a pixel coordinate system wherein each pixel is assigned a single number. In this particular 25-pixel example, shifting one pixel to the right increases the coordinate by one, and shifting one pixel to the left decreases the coordinate by one, as was also the case in the previous example. However, in this arrangement, shifting one pixel up increases the coordinate by five and shifting one pixel down decreases the coordinate by five. In this example, the pixel in the bottom-left corner of the image is assigned location 0. Accordingly, the coordinate one pixel above and one pixel to the right of pixel 0 is 0+1 (one pixel to the right)+5 (one pixel up)=6. More complicated arithmetic is necessary to find the location of a pixel given its coordinate in this arrangement, however.

Pixels within thermal images can be compared to the dynamic range of the thermal image in which the pixel is located. That is, thermal data associated with each pixel can be compared with the dynamic range of the overall thermal image. When the thermal data associated with a particular pixel is near, at or beyond the limits of the dynamic range of the image, the pixel can be at or near saturation. To avoid saturation, parameters of a thermal imaging camera such as the gain can be manipulated.

According to certain embodiments of the present invention, a first thermal image having a first dynamic range can be captured using a first gain setting corresponding to a relatively high resolution and small dynamic range. The first setting may be built into the camera during manufacturing, or can alternatively be selected by the user. The thermal imaging camera also captures a second image of substantially the same scene and having a second dynamic range different than the first. The second dynamic range can be such that the upper limit of the dynamic range of the second image is higher than the upper limit of the dynamic range of the first thermal image, and the second dynamic range at least partially overlaps the first. Additionally or alternatively, the second image can be such that the lower limit of the dynamic range of the second image is lower than the lower limit of the dynamic range of the first while providing overlap of the dynamic ranges. In some embodiments, the second thermal image can be acquired using a second gain setting corresponding to a lower resolution and a larger dynamic range than the first. In some embodiments of the invention, the dynamic range of the first image lies entirely within the dynamic range of the second. That is, the first dynamic range can be nested in the second. It should be noted that, as used herein, the first dynamic range being "within" the second does not preclude the two ranges from sharing a boundary unless otherwise stated. Furthermore, the first and second images need not be acquired in any particular order—i.e. the second image may be captured prior to the first.

Because of its comparatively small dynamic range and high gain, the signal-to-noise ratio of the first image is likely to be larger than that of the second. In a radiometric calculation, for example, errors or uncertainty in temperature measurements due to noise are likely to be higher in the second image than in the first. Thus, for images or portions of images that fall within both the first and the second dynamic range, the first image is more likely to yield a more accurate thermal measurement than the second. However, because of its small dynamic range, the first image is more likely to comprise portions of a thermal scene that do not lie within its thermal dynamic range. This can result in saturation, wherein a true thermal measurement of the saturated portions of the image is impossible since components therein lie outside of the dynamic range.

Figure 5:
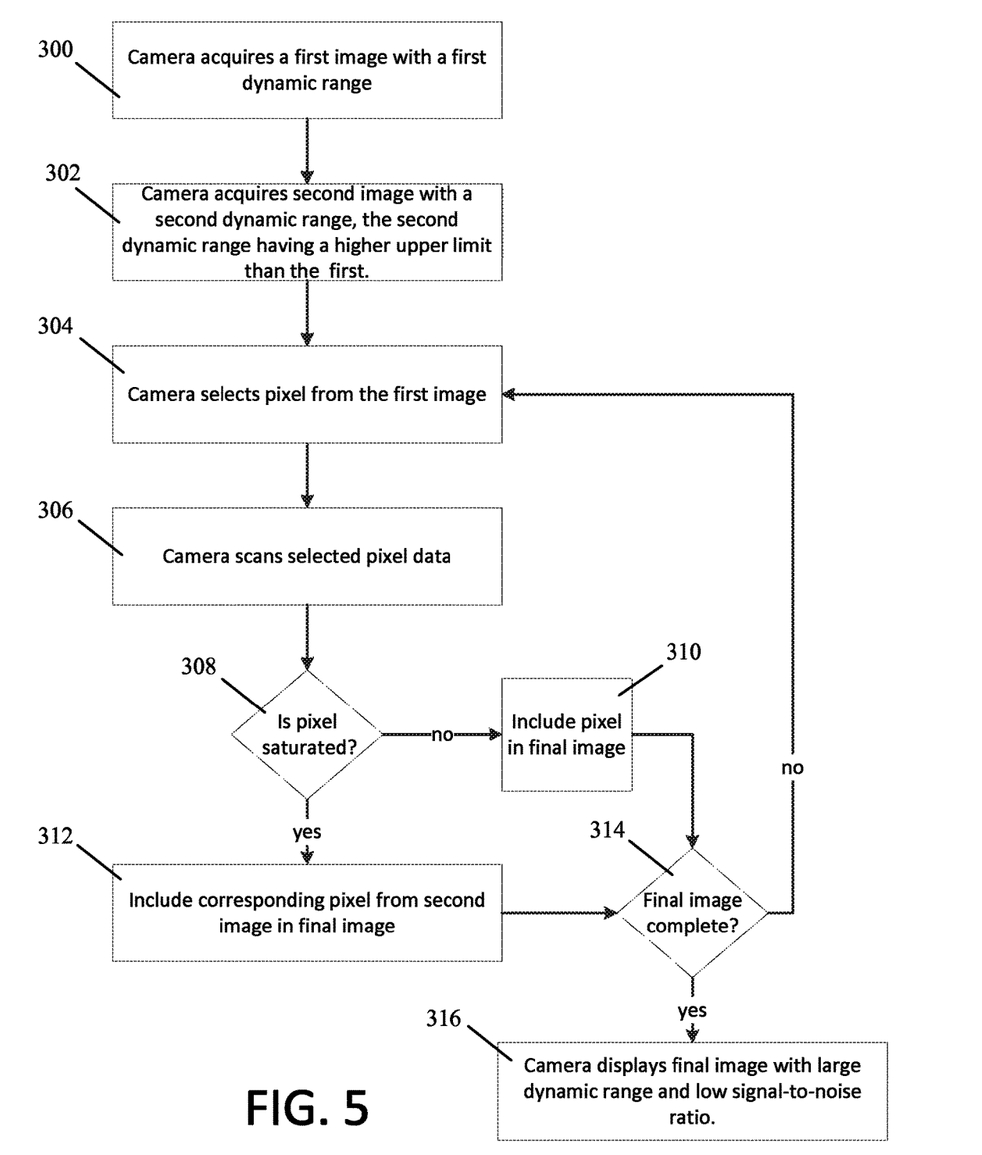
FIG. 5 is a process flow diagram outlining an exemplary procedure for creating a final image according to an embodiment of the present invention.

Embodiments of the present invention combine the first and second images in such a way so as to substantially maintain the large signal-to-noise ratio of the first image and the large dynamic range of the second. To do so, in certain embodiments, the camera can construct a final image, the final image comprising select parts of both the first and second images. FIG. 5 is a process flow diagram outlining an exemplary procedure for creating a final image according to an embodiment of the present invention. As described, a camera acquires a first image 300 and a second image 302, with the dynamic range of the first image having a lower upper limit than and at least partially overlapping that of the second. In some embodiments, the dynamic range of the first image can be completely within the dynamic range of the second. The camera then selects 304 a pixel having a first pixel coordinate from the first image and scans 306 the pixel data, or thermal data associated with that pixel, in relation to its dynamic range.

The camera determines 308 if the pixel comprises a thermal value that is saturated or, in some embodiments, is near saturation. That is, if the thermal data associated with a particular pixel is at or near saturation with respect to the dynamic range of the thermal image. If not, and the thermal data associated with that pixel is sufficiently within the first dynamic range, this pixel or pixel data is included 310 in the corresponding first pixel coordinate of the final image. If the pixel is at or near saturation, however, the camera will include 312 the corresponding pixel of the second image (i.e. the pixel with the first pixel coordinate) in the corresponding first pixel coordinate of the final image. Whether a pixel is considered near saturation can be determined, for example, by whether it is within a certain percentage of or a certain absolute distance from the boundary of the dynamic range. Since pixels from the first and second images are being combined into the final image, in many embodiments the first and second image are of substantially the same target scene. This can be accomplished with, for example, a substantially fast frame rate so that there is minimal time for the scene to change between captured images.

After it is determined from which of the first and second image a particular pixel of the final image will come, the camera determines 314 if the final image is complete, that is, if every pixel coordinate of the final image comprises pixel data from one of the first and the second images. If not, the camera selects 304 another pixel from the first image to scan 306 and the process continues. In some embodiments, the camera may select pixels sequentially, such as scanning each pixel in one complete row or column before moving on to another. Once the camera determines 314 that the final image is complete, the camera displays 316 the final image. The final image comprises the large dynamic range of the second image, and also substantially comprises the high signal-to-noise ratio of the first image. Substantially comprising the high signal-to-noise ratio of the first image implies that the high ratio of the first image is present at least in the pixels from the first image incorporated into the final image.

It should be noted that the process described above is exemplary, and that other, similar processes, such as those with certain steps permuted, are also within the scope of the invention. For example, the second image may be taken prior to the first. The camera may also populate the final image with all eligible pixels from the first image prior to filling in the missing pixels from the second image. The camera also may determine which pixels from which image will be used prior to constructing the final image at all. Accordingly, in some embodiments of the invention, the camera can define two sets of pixels—a first set that comprises pixels that are not saturated or near saturated in the first image, and a second set that comprises the pixels that are not in the first set. Thus, in such embodiments, the final image can be constructed from the first set of pixels from the first image and the second set of pixels from the second image, regardless of when in the process and in what order the final image is populated with pixels.

It is also within the scope of the invention to, in some embodiments, provide a third image. In some embodiments, the third image comprises a third dynamic range with an upper limit higher than that of the first and second dynamic ranges, and at least partially overlapping the second dynamic range. In further embodiments, the third dynamic range can be such that the first and second dynamic ranges are each contained within the third. The first, second and third dynamic ranges can be nested, such that the first dynamic range is within the second, which is within the third. In embodiments comprising three thermal images, the procedure of constructing a final image can proceed similarly to that described in FIG. 5. However, in embodiments comprising such a third dynamic range, if a pixel is saturated in the first image, the corresponding pixel of the second image can be analyzed. If this pixel is saturated or near saturated in the second image as well, the camera can include the corresponding pixel from the third image into the appropriate coordinates of the final image. Thus, in some embodiments, the camera may define a third set of pixels, the third set comprising pixels that are not in the first set as defined above, and are also at or near saturation in the second image. Accordingly, in some embodiments, the final image can comprise a first set of pixels from the first image, a second set of pixels from the second image, and a third set of pixels from the third image.

Note that in embodiments comprising a plurality of sets of pixels from each of a plurality of thermal images it is possible for any of these sets to be empty, as it is possible that in certain scenes there are no pixels that fall within a particular dynamic range but not the one smaller than it. In some embodiments, each dynamic range shares a single boundary. For example, in some embodiments, the lowest portion of each dynamic can be constant among each acquired image.

Similarly, in various embodiments, any number of images can by implemented in the structure described, as long as each successive dynamic range has a higher upper limit than and at least partially overlaps the previous so as to expand the imaging range of the camera. The camera can then define a set of pixels from each image to be combined together to form the final image. In some embodiments, the thermal images can be such that the dynamic range of each thermal image contains every other dynamic range smaller than itself. In such embodiments, the final image can be constructed such that a particular pixel in the final image comprises thermal data associated with the corresponding pixel in thermal imaging having the smallest dynamic range in which that particular pixel is not saturated or near saturated.

An alternative view but similar process entails analyzing the gain associated with the first and second (and possibly more) images instead of dynamic ranges. An analogous arrangement can comprise a first image and a second image, the first image having a larger gain than the second. Similarly to the previously described process, if a pixel of the first image is saturated, then the corresponding pixel of the second image may be used in the final image. There can also be a third image whose gain is smaller still than the second, so that if the pixel is saturated in the second image, the corresponding pixel of the third image may be used. Thus, a method for constructing a final image according to some embodiments can include determining, for each pixel, which image in which that particular pixel is not saturated has the highest gain, and incorporating the pixel data from that image into the corresponding pixel coordinate of the final image.

In some embodiments, timing of the image capture is important. Because of the stitching together of pixels of multiple images, it can be important that the target scene of each image is substantially the same. If the scene changes significantly between the acquisition of the first and second images, for example, then the pixels from the first image included in the final image will not necessarily align correctly with the pixels from the second image that are included, even though the appropriate pixel coordinates are filled. Accordingly, it can be advantageous for the camera to capture the first and second images with a small or minimal delay between them. In some embodiments of the invention, the capture times of and between the first and second images are such so as to enable real time construction and display of the final images at a particular frame rate.

Figure 6:
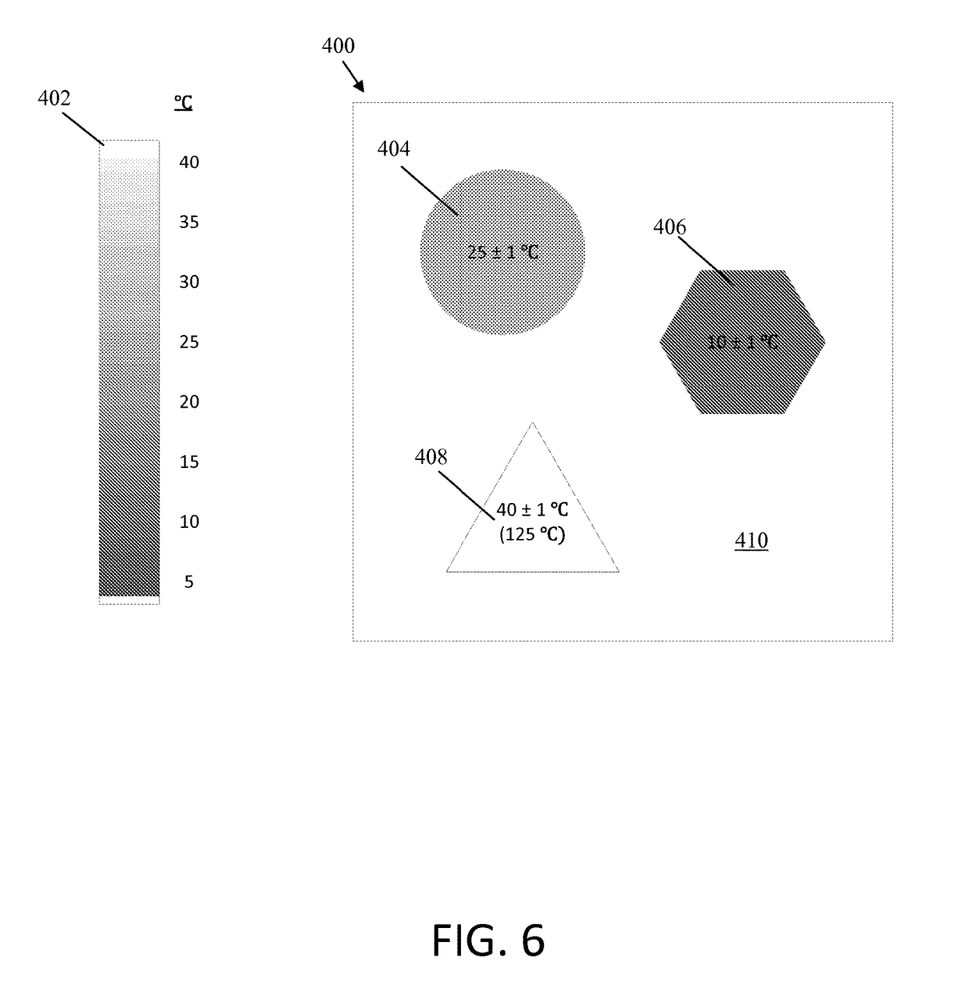
FIG. 6 shows a first image of a thermal scene comprising a small dynamic range.
Figure 7:
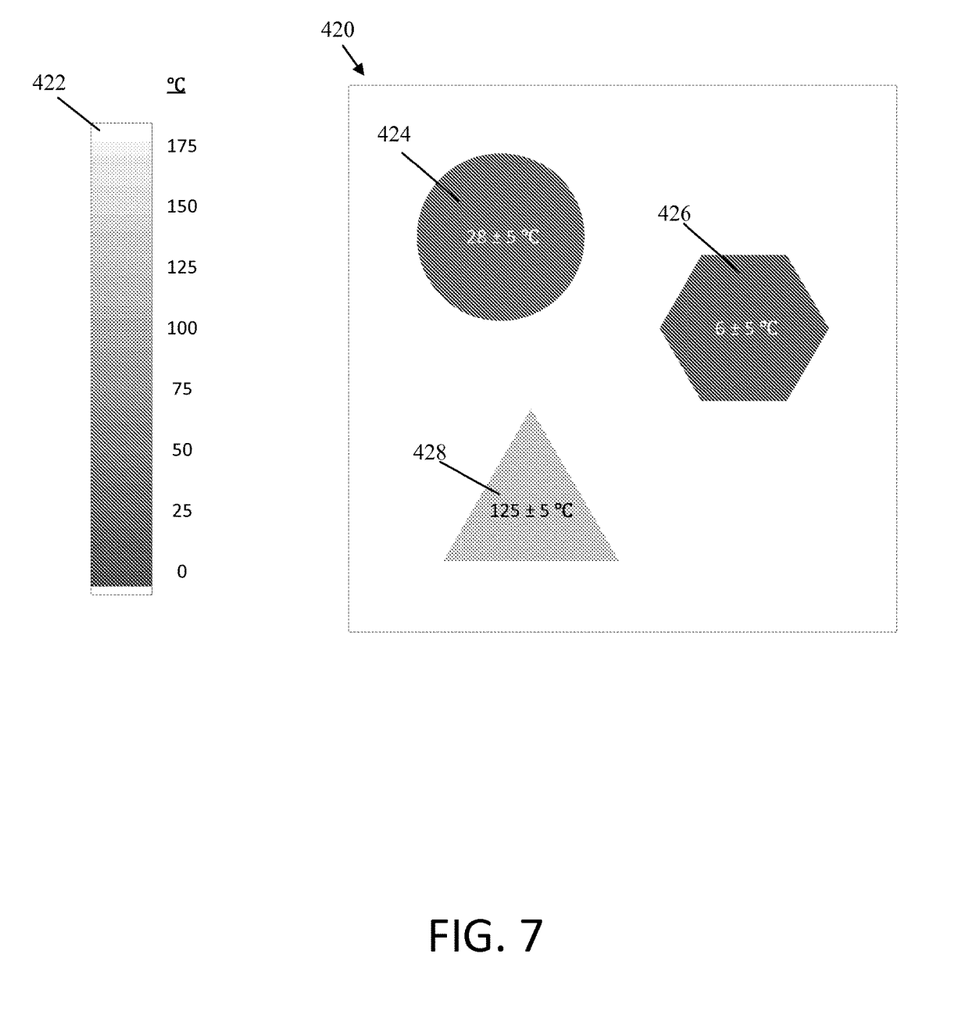
FIG. 7 shows a second image of the thermal scene of FIG. 6 comprising a larger dynamic range.
Figure 8:
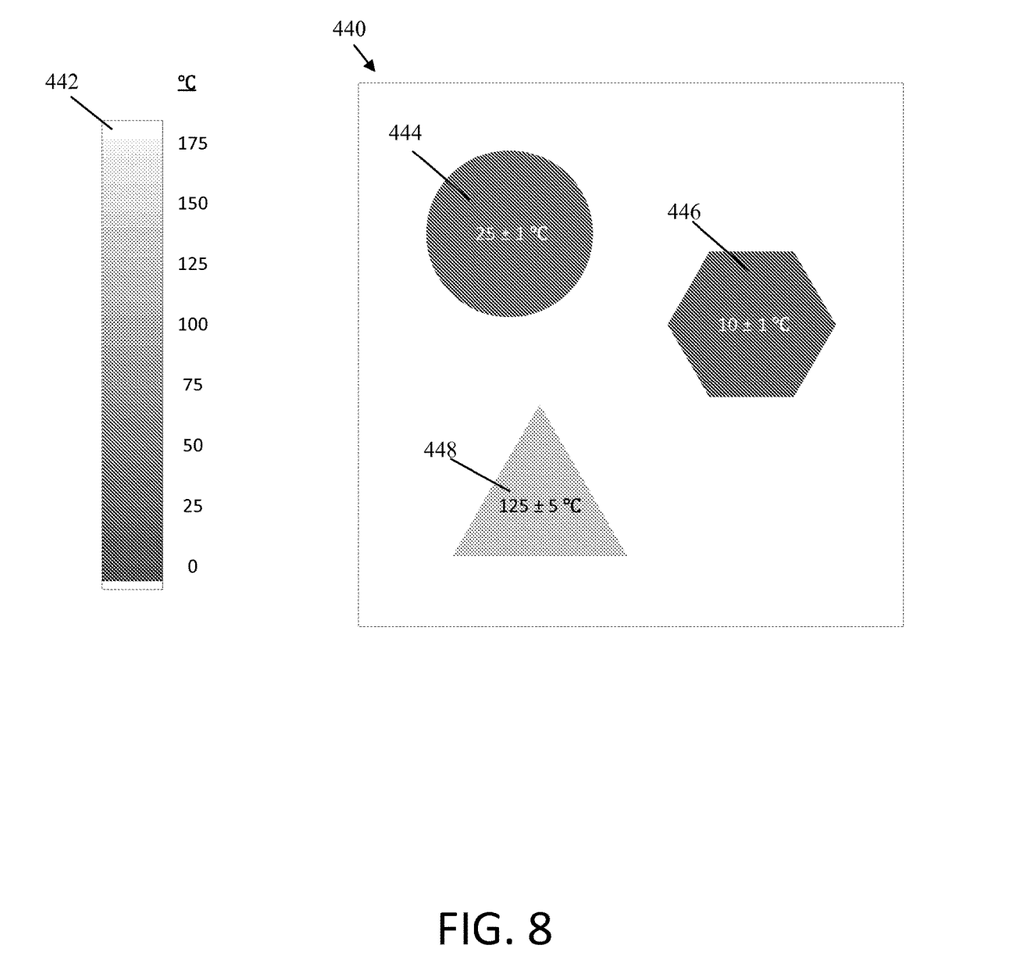
FIG. 8 shows a final image of the thermal scene of FIGS. 6 and 7.

FIGS. 6-8 show thermal image scenes captured by a thermal imaging camera according to embodiments of the present invention. FIG. 6 shows a first image of a thermal scene comprising a small dynamic range. FIG. 6 comprises a thermal scene 400 comprising a temperature scale 402 and showing a circle 404, a hexagon 406 and a triangle 408, each representing elements within the scene having different temperatures. These elements are shown on a background 410, which is left blank for clarity in each of FIGS. 6-8—it should not be analyzed on the temperature scale shown. Here, the temperature scale 402 ranges from 5° C. to 40° C., which is roughly the dynamic range of the image. In some embodiments, a temperature scale may show the entire dynamic range, while in others it may show an alternative scale. In this illustrative embodiment, with this particular dynamic range, the thermal imaging camera is able to resolve temperatures to within ±1° C., and measures the temperatures of the circle 404, hexagon 406 and triangle 408 to be 25° C., 10° C. and 40° C., respectively. Since 40° C. is at or near the upper limit of the dynamic range, it is possible that the pixels reading 40° C. could be saturated, showing an inaccurate display. In this case, the true temperature of the triangle 408, 125° C., is labeled in parentheses, indicating that, while characterized by the camera in this dynamic range as being 40° C., the pixels are in fact saturated and the temperature truly is significantly higher.

FIG. 7 shows a second image 420 of the thermal scene of FIG. 6 comprising a larger dynamic range. In this figure, the temperature scale 422 reads from roughly 0° C. to 175° C., with this being roughly the dynamic range of the image. Additionally, due to a comparatively smaller signal-to-noise ratio in this dynamic range, the camera is only able to resolve temperatures to within ±5° C. The camera measures the temperatures of the circle 424, hexagon 426 and triangle 428 to be 28° C., 6° C. and 125° C., respectively. Assuming that the second image 420 of the scene was taken very shortly after (or before) the first, it is assumed that the temperatures of these features are constant between the images. Thus, the measurement of 25±1° C. of the circle 404 of FIG. 6 is likely to be a more accurate representation of the temperature than is the measurement of 28±5° C. of the circle 424 of FIG. 7. However, because of the larger dynamic range of the thermal scene 420 of FIG. 7, the pixels of the triangle 428 are no longer saturated, and so the thermal imaging camera is better able to assign a correct temperature to the triangle 428, namely, 125° C.

Embodiments of the present invention may capture the first and second images of FIGS. 6 and 7 and run a procedure such as that outlined in FIG. 5 to create a final image. Following the basic procedure, the camera scans through the pixels of the first image (FIG. 6), analyzing each pixel in relation to the dynamic range thereof. In this example, the camera will find that most of the pixels (the background 410, circle 404 and hexagon 406) fall within the dynamic range and can be displayed in the final image. However, when a pixel that is within the triangle 408 is analyzed, the camera can detect that the value of that pixel is at or near saturation, and can look to that pixel coordinate of the second image (FIG. 7) in order to populate that pixel coordinate in the final image. In this example, the camera can take the pixels of the second image associated with the triangle 428 to display in the final image, while populating the rest of the image with pixels from the first image.

FIG. 8 shows a final image 440 of the thermal scene of FIGS. 6 and 7. FIG. 8 comprises the large dynamic range of the second thermal image, shown in FIG. 7, since at least some pixels of the second image are implemented into FIG. 8. In the illustrated embodiment, those pixels, making up the triangle 448, have the same accuracy (±5° C.) and reading (125° C.) as the triangle 428 shown in the second thermal image of FIG. 7. The remaining portions of the final image, however, comprise pixels from the first image. For example, the circle 444 and hexagon 446 were substantially within the dynamic range of the first thermal image of FIG. 6, and thus are incorporated into the final image as they were measured in the first image with the smaller dynamic range. Accordingly, the pixels associated with the circle 444 and hexagon 446 maintained the accuracy (±1° C.) and temperature readings (25° C. and 10° C., respectively) from the circle 404 and hexagon 406, respectively, of the first thermal image, though the exemplary display color has changed due to their being in an image of a larger thermal contrast having a temperature scale 442. As a result, the final image comprises the large dynamic range of the second thermal image and, where possible, the accuracy and high signal-to-noise ratio of the first thermal image.

It should be noted that the above example is meant to illustrate the methods and advantages of particular embodiments of the invention and does not in any way limit the scope of the invention. For example, the temperatures, uncertainties, dynamic ranges and scenes herein described are all exemplary and do not define specific parameters of the invention. Moreover, while the examples above are described with respect to temperature, it is within the scope of the invention to apply the technique to other imagery, such as visible light images with light intensity defining the dynamic ranges, or thermal imagery comprising non-radiometric thermal data.

The present invention differentiates from the aforementioned prior systems at least in its method of pixel-by-pixel analysis. In some embodiments, every pixel of the first image is analyzed in relation to the first dynamic range. Subsequently, only pixels saturated or near saturated in the first image need to be analyzed and processed in the second image. Moreover, in some embodiments, the frame with the largest dynamic range need not be analyzed at all, since it is already known which pixels from the frame are to be used in the final image. For example, in an embodiment comprising a first and second image, after the first image is scanned and analyzed and it is determined which pixels from the first image will be used in the final image, it is already known that the remaining pixels not taken from the first image will be populated from the second image, and further, that the second image will contribute no additional pixels beyond these. Thus, the second image need not be scanned or analyzed at all. This is contrary to previous systems in which every pixel in every frame is analyzed.

It is within the scope of the invention to perform image analysis in the opposite order as well. For example, in some embodiments, the image with the larger dynamic range may be analyzed first such that each pixel is analyzed and compared to a known smaller dynamic range of a second image. In such an embodiment, the pixel data from the first image can be sent to the corresponding pixel coordinate in the final image unless it is determined that the pixel in that coordinate of the second image would not be saturated or near saturated in the second, smaller dynamic range. In such a case, the corresponding pixel data from the second image having the smaller dynamic range would be sent to the corresponding pixel in the final image.

In various embodiments of the present invention, dynamic ranges of thermal images may be defined by temperature values. According to other embodiments, the ranges may be defined in other ways. For example, in some embodiments, the camera can comprise an ADC configured to convert analog signals from the FPA into digital counts. Such counts may be used to analyze pixels and define the dynamic ranges of thermal images. If ranges are defined and pixels analyzed with respect to counts as opposed to temperature, there is no requirement to calculate a temperature value for each pixel of each frame. Rather, the temperature calculations may be performed a single time for only the pixels in the final image, which can save on processing time. In other embodiments, temperatures may not be calculated at all. Once the final image is constructed, it can be displayed in the largest dynamic range so as to not display any saturated pixels. However, in certain embodiments of the invention, the displayed dynamic range of the final image may be selectable by the user, since a large dynamic range on the display may inhibit visual distinguishability of similar temperatures within the scene.

Example thermal image cameras and related techniques have been described. The techniques described in this disclosure may be performed by a system comprising a thermal imaging camera and a processor for executing instructions for performing such processes. Techniques may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media. Additionally, techniques can be performed by a separate computing device external to a camera. For example, images taken on a camera may be transferred to a separate computer for analysis and combination. The computer, then, can perform the pixel-by-pixel analysis of the images in order to create a final image of large dynamic range and improved signal-to-noise ratio.

Various examples have been described. These and other examples are within the scope of the following claims.

The invention claimed is:

1. A non-transitory computer readable medium containing executable instructions causing one or more processors to perform a method of creating a final thermal image from at least a first and second thermal image of a scene, the second thermal image having a larger dynamic range than the first thermal image, the method comprising:
    defining a first set of pixels in the second thermal image, the first set of pixels consisting of pixels not saturated or nearly saturated with respect to the dynamic range of the first thermal image;
    defining a second set of pixels in the second thermal image, the second set of pixels consisting of pixels not saturated or nearly saturated with respect to the dynamic range of the second thermal image;
    constructing a final thermal image comprising the first set of pixels from the first thermal image and the second set of pixels from the second thermal image.

2. The non-transitory computer-readable medium of claim 1, wherein the dynamic range of the first thermal image is within the dynamic range of the second thermal image; and the method comprises:
    analyzing a plurality of pixels in the second thermal image, and for each analyzed pixel,
    if the pixel within the second thermal image is within the first dynamic range of the first thermal image, considering such pixel to be in the first set of pixels such that the first set of pixels comprises pixels in the second thermal image that are within the dynamic range of the first thermal image.

3. The non-transitory computer-readable medium of claim 2, wherein
    the method further comprises defining a third set of pixels in the second thermal image; and wherein
    the final thermal image comprises the first set of pixels form the first thermal image, the second set of pixels from the second thermal image, and the third set of pixels from a third thermal image.

4. The non-transitory computer-readable medium of claim 3, wherein the dynamic range of the third thermal image is within the dynamic range of the first thermal image, within the dynamic range of the second thermal image, or within both the first dynamic range and the second dynamic range.

5. The non-transitory computer-readable medium of claim 1, wherein the dynamic ranges of the first and second thermal images are defined by a number of digital counts.

6. The non-transitory computer-readable medium of claim 1, wherein the method further comprises presenting the final thermal image on a display.

7. The non-transitory computer-readable medium of claim 6, further comprising executable instructions causing the one or more processors to:
    repeatedly perform the method for a plurality of sets of first and second thermal images; and
    repeatedly update the generated display.

8. A thermal imaging system comprising:
    an infrared camera module configured to capture thermal images;
    a processor configured to:
    capture a first thermal image of a target scene via the infrared camera module, the first thermal image having a first dynamic range;
    capture a second thermal image of the target scene via the infrared camera module, the second thermal image having a second dynamic range different from the first;
    designate a first set of pixels and a second set of pixels representative of portions of the target scene such that the first set of pixels are not saturated or nearly saturated with respect to the first dynamic range and the second set of pixels are not saturated or nearly saturated with respect to the second dynamic range; and
    generate a final image comprising the first set of pixels from the first thermal image and the second set of pixels from the second thermal image.

9. The thermal imaging system of claim 8, wherein the processor is further configured to:
    capture a third thermal image of the target scene via the infrared camera module, the third thermal image having a third dynamic range; and
    designate a third set of pixels representative of portions of the target scene; and wherein the generated final image comprises the third set of pixels from the third thermal image.

10. The thermal imaging system of claim 9, wherein the third dynamic range contains the first and second dynamic ranges, and wherein the processor is further configured to analyze a plurality of pixels in the third thermal image, and wherein
    if the pixel is not saturated or nearly saturated with respect to the first thermal image, designating such pixel to be in the first group of pixels, and
    if the pixel is not within the first group of pixels and is not saturated or nearly saturated with respect to the second dynamic range, designating such pixel to be in the second group of pixels.

11. The thermal imaging system of claim 8, further comprising user interface, and wherein a user can select at least one of the first and second dynamic ranges via the user interface.

12. The thermal imaging system of claim 11, further comprising a housing supporting the processor, the user interface, and the infrared camera module.

13. The thermal imaging system of claim 11, wherein the user can select a number of thermal images to capture for generating the final image, and wherein the processor is configured to:
- acquire the selected number of thermal images of the target scene, each of the acquired thermal images having a different dynamic range; and
- designate an equal number of sets of pixels as the selected number of thermal images, each set of pixels corresponding to an acquired thermal image; wherein
- the final image comprises, from each of the acquired thermal images, the set pixels corresponding to that thermal image.

14. The thermal imaging system of claim 8, wherein designating the first set of pixels comprises analyzing a plurality of pixels in the first thermal image, and, for each analyzed pixel, if the pixel is not saturated or nearly saturated in the first thermal image, designating such pixel to be in the first set of pixels.

15. The thermal imaging system of claim 8, wherein designating the first set of pixels comprises analyzing a plurality of pixels in the second thermal image, and, for each analyzed pixel, if the pixel in the second thermal image is not saturated or nearly saturated with respect to the first dynamic range, designating such pixel to be in the first set of pixels.

16. The thermal imaging system of claim 8, further comprising a visible light camera module configured to generate visible light image data, and wherein the final image comprises visible light image data.

17. The thermal imaging system of claim 8, wherein the first dynamic range is within the second dynamic range.

18. A thermal image generation system comprising:
- a memory configured to store a plurality of thermal images; and
- a processor in communication with the memory and configured to generate a final image from a plurality of thermal images of a target scene, each of the plurality of thermal images having a different dynamic range and wherein the largest dynamic range contains each of the smaller dynamic ranges; and wherein generating the final image comprises:
- analyzing, pixel by pixel, the thermal image having the largest dynamic range;
- for each pixel, selecting a thermal image from the plurality of thermal images in which the pixel is not saturated or nearly saturated; and
- constructing a final image using, for each pixel in the final image, the corresponding pixel from the selected thermal image.

19. The thermal image generation system of claim 18, wherein selecting a thermal image from the plurality of thermal images for each pixel comprises determining which thermal image in the plurality of thermal images includes the smallest dynamic range in which the pixel is not saturated or nearly saturated and selecting such thermal image, whereby constructing the final image comprises using, for each pixel, the corresponding pixel from the thermal image having the smallest dynamic range and in which the pixel is not saturated.

20. The thermal image generation system of claim 18, further comprising an infrared camera module configured to capture the plurality of thermal images.

* * * * *